United States Patent
Wey et al.

(12)

(10) Patent No.: US 6,215,764 B1
(45) Date of Patent: Apr. 10, 2001

(54) METHOD AND APPARATUS FOR DETECTING THE NETWORK LINK STATUS OF COMPUTER SYSTEMS

(75) Inventors: Yih-Sheng Wey, Hsinchu; Hui-Chen Hsieh, Chang Hwa Hsien; Yen-Jiuan Chao, Hsinchu, all of (TW)

(73) Assignee: Silicon Integrated Systems Corp., Hsinchu (TW)

( * ) Notice: Subject to any disclaimer, the term of this patent is extended or adjusted under 35 U.S.C. 154(b) by 0 days.

(21) Appl. No.: 09/090,582

(22) Filed: Jun. 4, 1998

(51) Int. Cl.[7] .................. G06F 1/06; G06F 1/26
(52) U.S. Cl. ............ 370/216; 370/311; 713/300; 713/310; 713/320; 714/2; 455/13.4; 710/46
(58) Field of Search ................... 713/300, 320, 713/323, 324, 310; 714/2; 455/13.4; 370/216, 311, 463; 710/46

(56) References Cited

U.S. PATENT DOCUMENTS 5,504,910 * 4/1996 Wisor .................................. 395/750
6,011,799 * 1/2000 Kerstein ............................... 370/422
6,026,494 * 2/2000 Foster .................................. 713/320
6,055,641 * 4/2000 Konaka ............................... 713/320

* cited by examiner

Primary Examiner—Hassan Kizou
Assistant Examiner—Roberta Stevens (57) ABSTRACT

A method and apparatus for detecting the link status of a network device in a computer system. An automatic link status detection mechanism allows a system to operate intelligently in a normal operation mode if the link status is on, or a suspend mode if the link state is down. The mechanism includes an auto link poll controller and a polling cycle generator for generating a sequence of polling cycles to query the link status of the network device. A media independent interface management frame having a preamble field is generated in a polling cycle. Because of the improved preamble field, it is to assure that an exact polling cycle is complete when a polling cycle is issued to the physical layer of the network device.

15 Claims, 7 Drawing Sheets

FIG. 1

| time unit (sec) | polling frequency (time unit) | link loss time out value (time unit) | cable disconnect time |
|---|---|---|---|
| 163.88u | 16 | 128 | 20.97664ms |
| 163.88u | 10 | 120 | 19.6656ms |
| 1m | 10 | 100 | 100ms |
| 1m | 15 | 90 | 90ms |
| 10m | 7 | 70 | 700ms |
| 10m | 9 | 100 | 1sec |
| 100m | 5 | 80 | 8sec |
| 100m | 8 | 60 | 6.4sec |
| 1 | 1 | 5 | 5sec |
| 1 | 2 | 7 | 8sec |
| 1.34217728 | 1 | 1 | 1.34217728sec |
| 1.34217728 | 2 | 4 | 5.36870912sec |

| | PREAMBLE | ST | OP | PHYAD | REGAD | TA | DATA | IDLE |
|---|---|---|---|---|---|---|---|---|
| READ | 1.....1 | 01 | 10 | AAAAA | RRRRR | Z0 | DDDDDDDDDDDDDDDD | Z |
| WRITE | 1.....1 | 01 | 01 | AAAAA | RRRRR | 10 | DDDDDDDDDDDDDDDD | Z |

32 ones

FIG. 6

| | PREAMBLE | ST | OP | PHYAD | REGAD | TA | DATA | IDLE |
|---|---|---|---|---|---|---|---|---|
| READ | 1......1 | 01 | 10 | AAAAA | RRRRR | Z0 | DDDDDDDDDDDDDDDD | Z |
| WRITE | 1......1 | 01 | 01 | AAAAA | RRRRR | 10 | DDDDDDDDDDDDDDDD | Z | at least 64 ones

FIG. 7

METHOD AND APPARATUS FOR DETECTING THE NETWORK LINK STATUS OF COMPUTER SYSTEMS

FIELD OF THE INVENTION

The present invention relates generally to computer network systems, and more particularly to a method and apparatus for detecting the link status of a network device in a computer network system.

BACKGROUND OF THE INVENTION

The past few years have been an exciting and challenging time of the information age and information channels will form the most important links in the most current message-based enterprises of the future. The computer network systems have become a major part of this evolution. The development of computer network systems goes further by providing message-based communication schemes.

Nowadays, as long as a computer system is powered on, users can use any function which was already installed in the computer system at any time. However, if a user has a time period without using the computer system, the system is still being with power on unless the system is powered off. This consumes system power and conflicts with environment protection. In order to save energy, it is therefore preferable that the computer system can automatically detect the current status of whole system utilization so that it can determine whether some of system components should be powered off. As a result, it greatly saves the electrical power. Moreover, if a new job to be performed is found, the system can be fully powered on automatically, and quickly enters its working state.

For a computer in a network system, if the network is disconnected, data can not be transferred through the network. Therefore, the network communication performance can be greatly improved if the data transfer of a computer is determined first by referring to the current link status of its network system.

Polling is one of conventional methods of communicating important timely message for a computer network system. Software polling is a traditional way to query the link status of a physical layer chip (PHY) for a network device. In the design of this approach, a management frame (as defined in the IEEE 802.3u standard) is transmitted to the MII (Media Independent Interface) management interface for asking a PHY the link status information. The software must fill the management frame by bit by bit. It is thus not efficient. Alternatively, automatically polling through the hardware can be an efficient way to accomplish the same functionality and reduce the loading of software.

Another traditional way to query the link status of a network device is to poll a status register inside the PHY when its polling function is enabled and the polling to the status register stops only when the polling function is disabled. The MII is thus occupied and not available to other jobs. As a result, it defers reading other registers.

From the foregoing discussions of prior arts, it can be seen that the disadvantages as pointed out earlier make the conventional approach inappropriate for a computer system to detect the status about its communications links. There exists a strong need for having a more efficient method and apparatus for a computer system to automatically detect the network link status (link on or link loss) about its communication links so that the computer system can operate in a proper mode accordingly and achieve the power saving features.

SUMMARY OF THE INVENTION

This invention has been made to overcome the above mentioned drawbacks and inefficiencies in a network system. The primary object of the present invention is to provide a new method and apparatus for automatically detecting the link status for a network device.

In accomplishing that object, it is another object of the invention to provide an automatic link status detection mechanism as characterized above to allow a computer system to operate intelligently in a proper mode. The possible operation modes include a normal operation mode if the link state is on, or a suspend mode if the link state is down. If a network on the system is disconnected and the system enters a suspend mode, the system can select the "wake up" conditions to resume itself from the suspend mode to a normal operation mode.

Another object of the invention is to provide a method to wake up a computer system. For a network, the current state is either in a "connect" or a "disconnect" state. Typically, when the current state for a network is in a "connect" state, receiving a special packet may wake up the computer system. While the original state for a network is in a "disconnect" state (or "link loss"), the resumed network connection may also wake up a computer system according to the present invention.

It is a further object of the present invention to provide a link status detection method in which "preamble" of the MII management frame is improved. In this MII management frame, it is to assure that an exact polling cycle is complete when a polling cycle is issued to a PHY.

Briefly, the invention discloses a method and apparatus for automatically detecting the link status of a network device to provide the most current information for saving energy and best utilization. Accordingly, the computer systems can adjust their operating conditions with a reliable low power. Additionally, it eliminates the inconvenience of having to power the system on and off frequently by a system user.

The foregoing and other objects, features, aspects and advantages of the present invention will become more apparent from a careful reading of a detailed description provided herein below, with appropriate reference to the accompanying drawings.

DETAILED DESCRIPTION OF THE PREFERRED EMBODIMENTS

Figure 1:
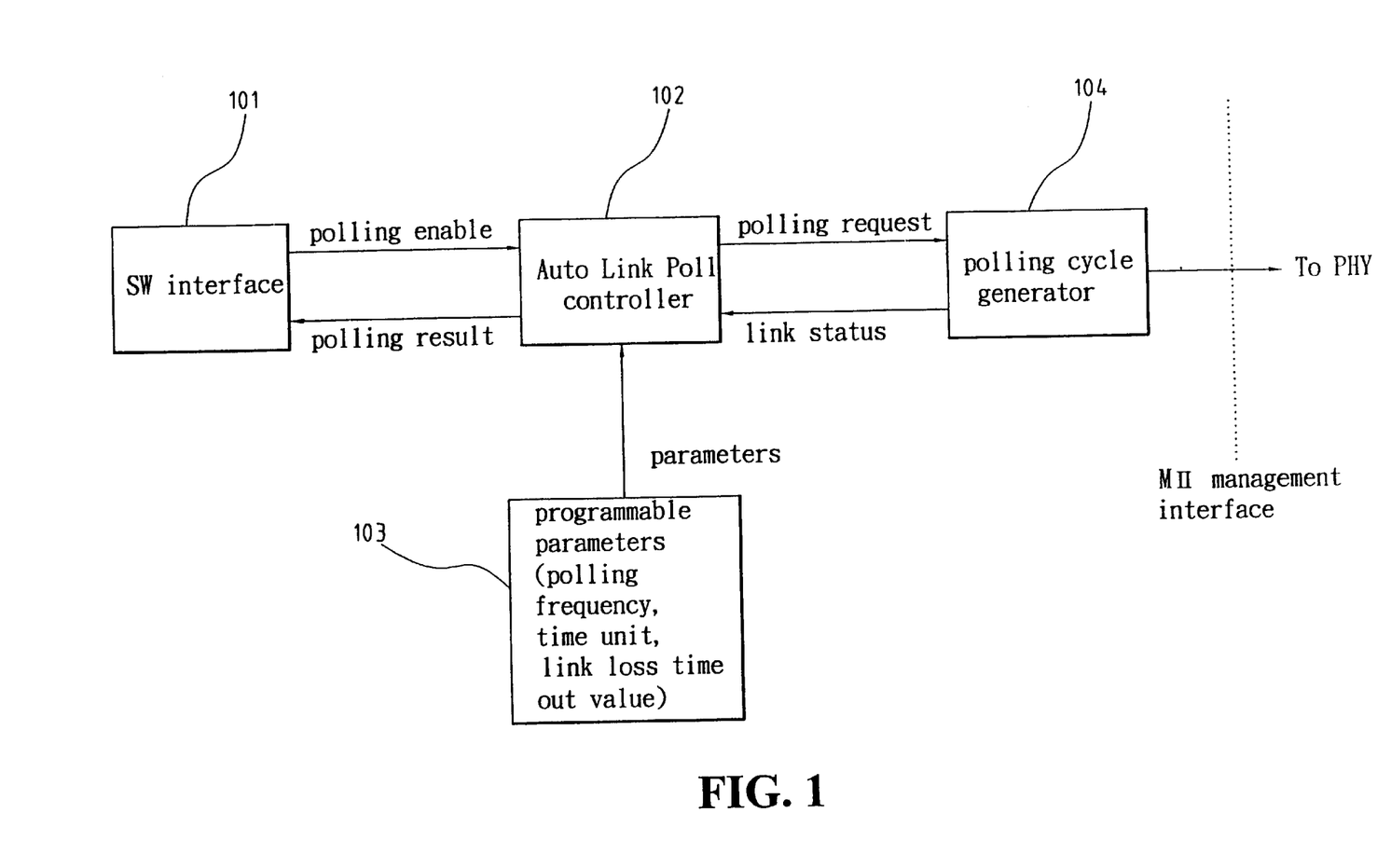
FIG. 1 illustrates a schematic diagram of the overall link status detection mechanism according to the present invention.
Figure 5:
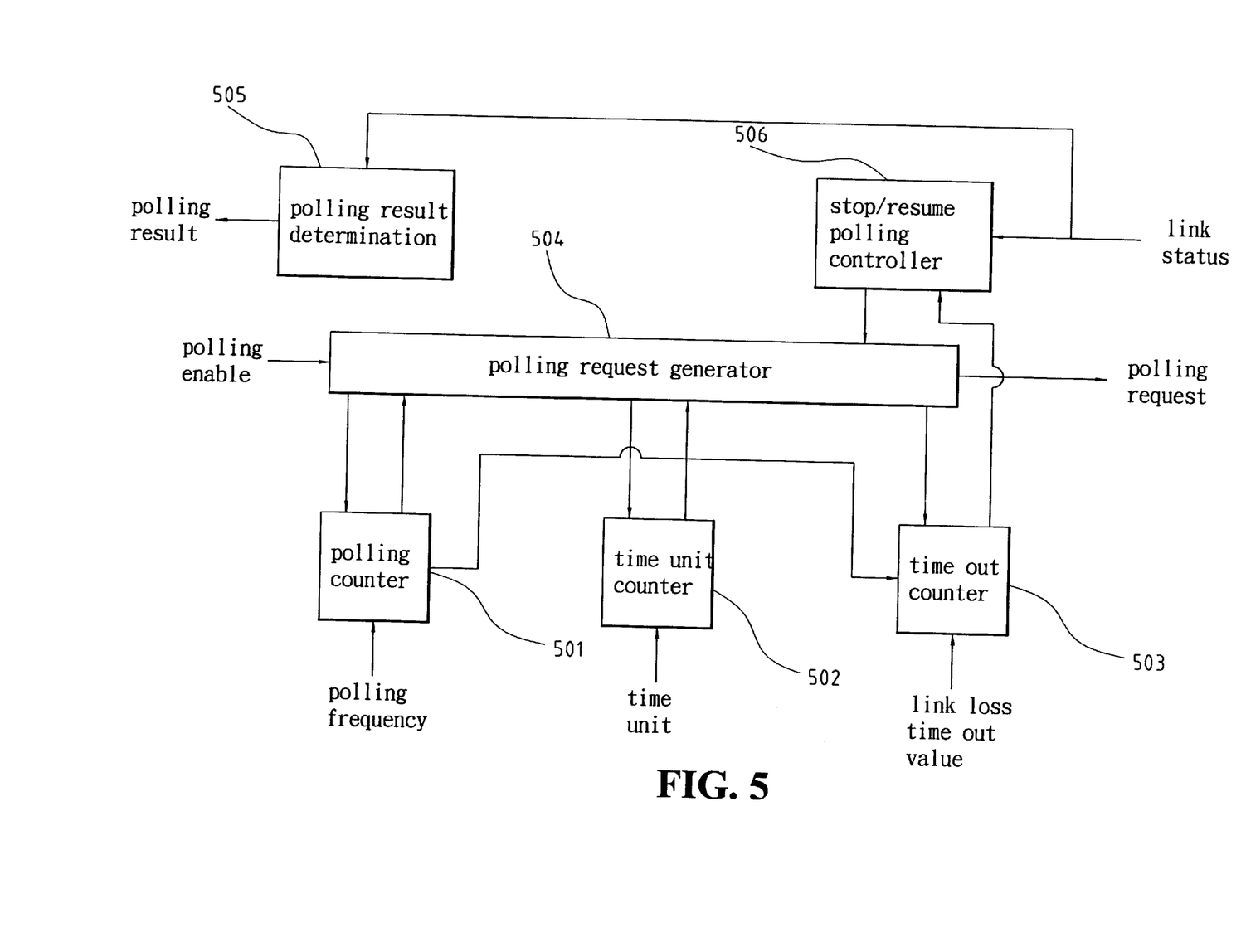
FIG. 5 illustrates the block diagram of the Auto Link Poll Controller shown in FIG. 1.

In the present invention, the primary point of novelty is the scheme of the overall link status detection for a network system, as shown in a schematic diagram in FIG. 1, and the major control logic employed therein as shown in functional block diagram of FIG. 5.

With reference first to FIG. 1, there is shown a network link status detection scheme of a computer system which uses the "Automatic Poll" method of the present invention. In the design of the "Automatic Poll" method, a computer system may select either polling for "link on" or for "link loss" depending on the practical application condition. When the data transfer for a network is in the normal condition, it may select polling for "link loss". If a cable is in the "disconnected" status, polling for "link on" may be selected.

Figure 2:
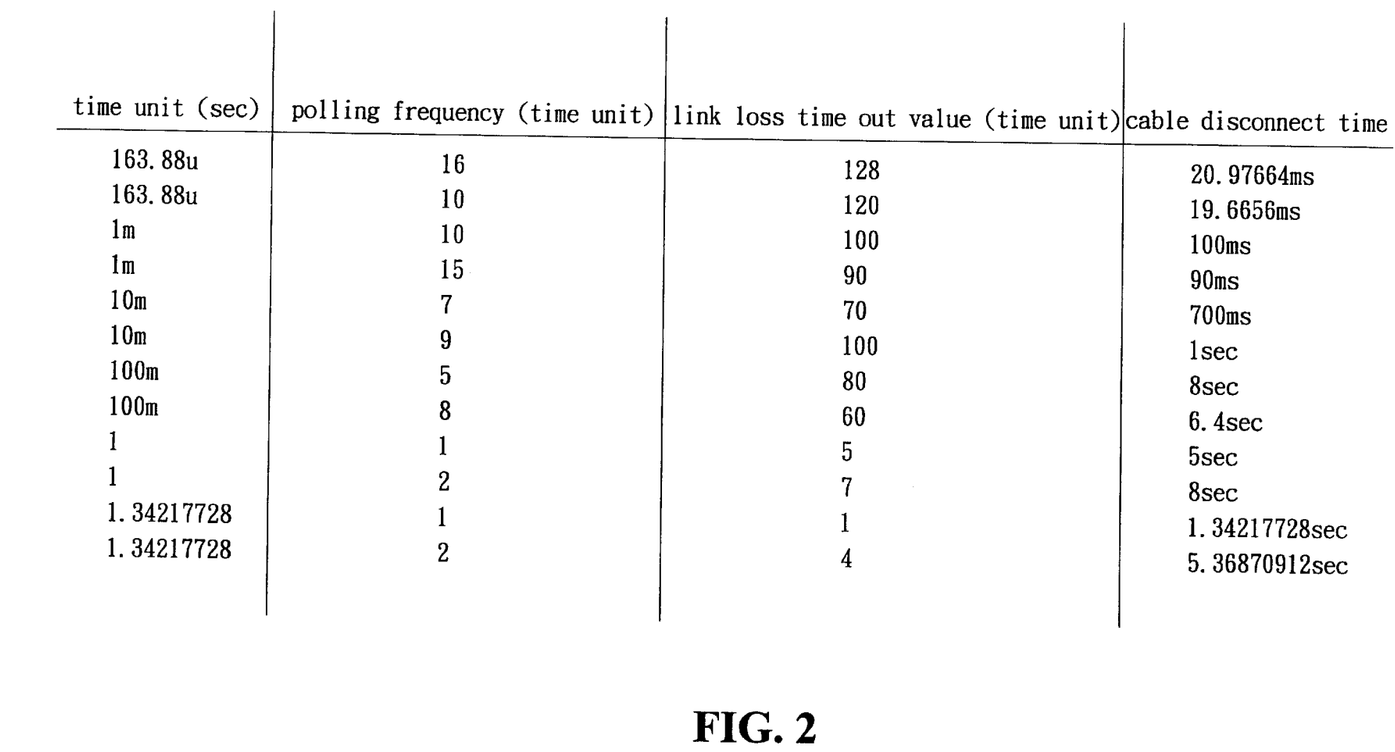
FIG. 2 illustrates possible combinations of the programmable parameters shown in FIG. 1 and the corresponding timing of the link status for a network.

As shown in FIG. 1, a software interface 101 initially informs an Auto Link Poll controller 102 for detecting a network link status by issuing a polling enable signal to the controller 102. Before enabling the polling request, the Auto Link Poll controller 102 refers to three programmable parameters 103 that can be used for determining how to do polling of the link status for the network. The three programmable parameters 103 to the Auto Link Poll controller 102 are a time unit, a polling frequency and a link loss timeout value. The possible combinations for these three parameters and the corresponding timing of the link status for a network are shown in FIG. 2.

In general, for a time unit, the default value is one second. The unit for a polling frequency is by the unit of the first parameter, i.e. a time unit. The polling frequency is the frequency of issuing polling cycles. Therefore, if a time unit of one second is used, one polling cycle is issued for every 'polling frequency' seconds. The third parameter, link loss timeout value, is a threshold value which determines whether a cable is regarded as being in disconnected status. The setting for the link loss timeout value may be based on the characteristics of a network, users' customs, and so on. If the disconnection time for a cable is longer than the link loss timeout value, the cable is regarded as being in disconnected status. Otherwise, the cable is regarded as being in temporarily changed status. The unit of the link loss timeout value is the time unit too.

After having set up the three programmable parameters, the Auto Link Poll controller 102 asserts a polling request to a polling cycle generator 104. The polling cycle generator 104 then generates a sequence of polling cycles to the MII management interface for asking a PHY the link status information. The PHY is to be detected. The function of the sequence of these cycles is to request that the PHY report its connection status back to the Auto Link Poll Controller 102.

Figure 3:
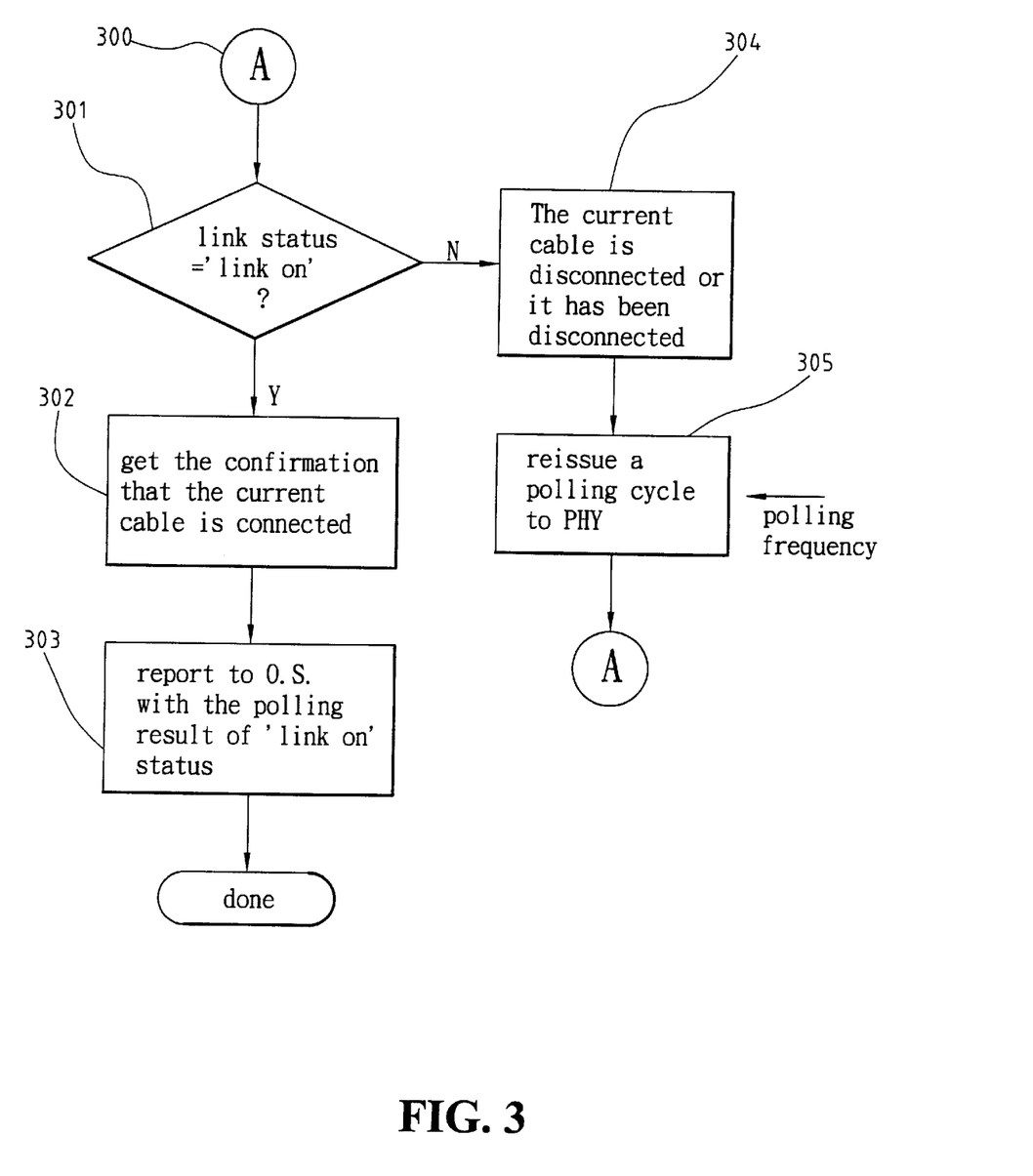
FIG. 3 comprises a flow diagram illustrating the general steps taken by the Auto Link Poll Controller of FIG. 1 when polling for "link on" is being selected.
Figure 4:
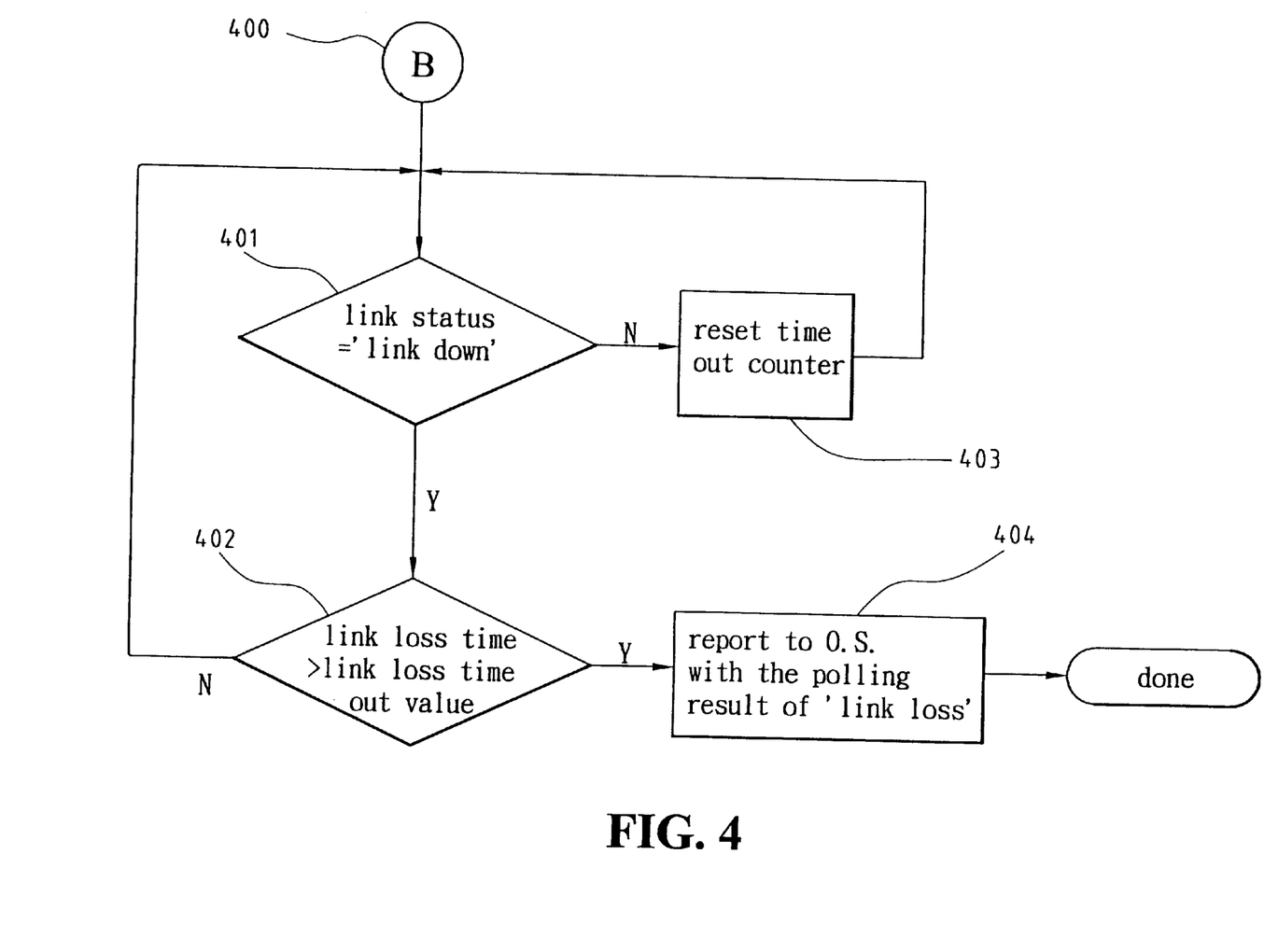
FIG. 4 comprises a flow diagram illustrating the general steps taken by the Auto Link Poll Controller of FIG. 1 when polling for "link loss" is being selected.

As we mentioned earlier, in the configuration of "Automatic Poll" method, a computer system may select either polling for "link on" or for "link loss" according to the present invention. FIG. 3 and FIG. 4 illustrate the general steps taken by the Auto Link Poll Controller 102 when polling for "link on" and "link loss" respectively.

FIG. 3 illustrates the general steps taken by the Auto Link Poll Controller 102 when polling for "link on" is being selected. As shown in step 300 of FIG. 3, the connection status reported from the PHY is first checked at step 301. If the link status is "link on", it can be confirmed that the current cable is connected (step 302). Then the Auto Link Poll Controller 102 brings the polling result of "link on" status and reports to the operating system (step 303). Following step 301, if the link status is not "link on", it shows that the current cable is disconnected or it was disconnected before (step 304). Then the Auto Link Poll Controller 102 reissues a polling request to the detected PHY at the time determined by the preset polling frequency (step 305).

FIG. 4 illustrates the general steps taken by the Auto Link Poll Controller 102 when polling for "link loss" is being selected. As shown in step 400 of FIG. 4, the connection status reported from the PHY is first checked at step 401. If the link status is "link down", the link loss timeout value is used in order to confirm that the current cable has not been connected for some continuous time period. As can be seen from step 402, a link loss time is given for comparing with the link loss timeout value. If it is less than the link loss time out value, the Auto Link Poll Controller 102 goes back to step 401 in order to continue checking the link status of the cable. Otherwise, the link loss time is greater than the link loss timeout value and the Auto Link Poll Controller 102 reports the polling result of 'link loss' status to the operating system (step 404). Following step 401, if the connected cable is detected, the Auto Link Poll Controller 102 resets a timeout counter (shown in FIG. 5) at step 403, and the link loss time out period is reset to start another new polling cycle for "link loss" (step 400).

According to the foregoing steps taken by the Auto Link Poll Controller 102, if a network device is detected as "disconnected" (link loss status), the Auto Link Poll Controller 102 reports to the operating system with such an event and the computer system enters the suspend mode. The mode changes no matter if a computer system is in a normal operation mode or is in a suspend mode. On the other hand, if a network device is detected as "connected" (link on status), the Auto Link Poll Controller 102 informs the operating system of such an event, and the computer system may resume from the suspend mode to a normal operation mode.

With reference to the block diagram of the Auto Link Poll Controller of FIG. 5, the controller comprises a polling counter 501, a time unit counter 502 and a timeout counter 503. The time unit counter 502 determines the time unit according to a preset value. The polling counter 501 informs a polling request generator 504 when the polling request must be issued according to a preset polling frequency. The timeout counter 503 determines the time of confirming the "link loss" status.

As described earlier, after the polling request generator 504 issues a polling request to the polling cycle generator 104, the Auto Link Poll Controller 102 waits for the link status reported from the polling cycle generator 104. According to the link status, the Auto Link Poll Controller 102 determines to stop polling or reissue a polling cycle. If reissuing a polling cycle is necessary, a stop/resume polling controller 506 of the Auto Link Poll Controller 102 informs the polling request generator 504 by asserting a polling enable. If stopping polling is necessary, a polling result determination unit 505 takes care of the situation and reports the polling result to software interface 101 (FIG. 1). The software interface 101 further reports to its first upper interface layer unit such as a driver. Finally, the upper layer unit reports to its higher upper layer unit, i.e. the operating system.

Figure 6:
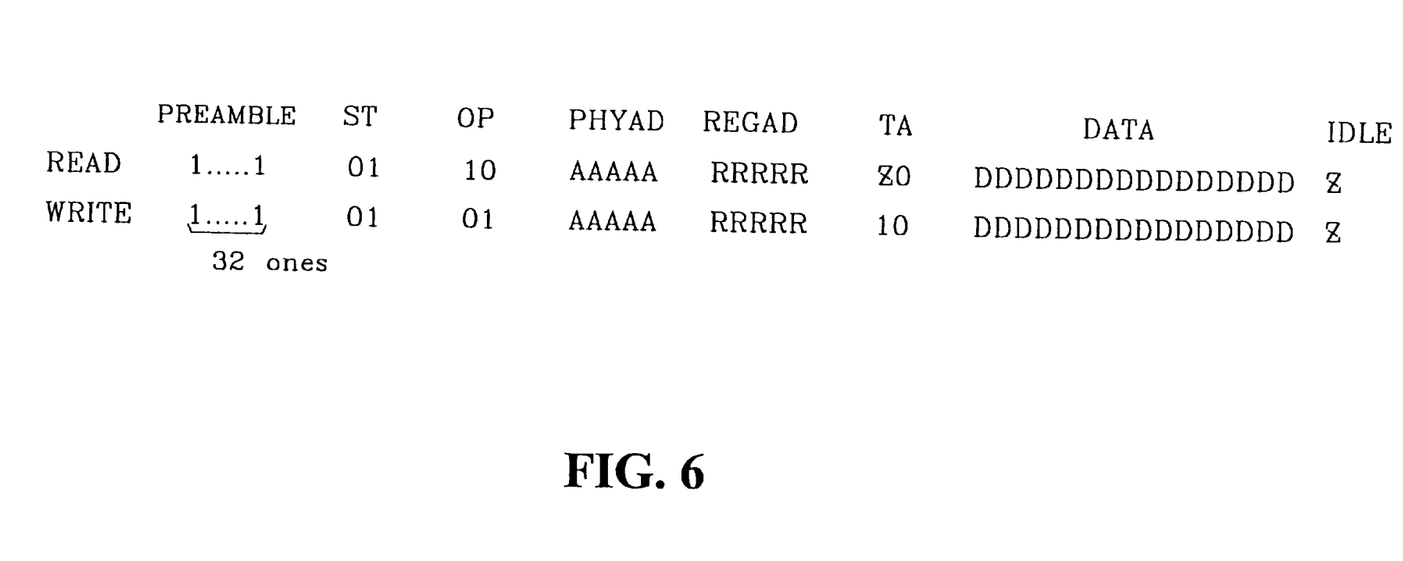
FIG. 6 illustrates the media independent interface management frame structure defined in IEEE 802.3u.

As we mentioned earlier, in order to assure that the exact polling cycle is complete when a polling cycle is issued to a PHY, the present invention further provides an improved "preamble" of the MII management frame. If a polling cycle is to be issued to a PHY, frames transmitted on the MII management interface shall have the frame structure. Traditionally, it first informs the network device by transmitting a sequence of preamble consisting of thirty-two 1s to the PHY as shown in FIG. 6. FIG. 6 shows the MII management frame structure defined in IEEE 802.3u. The order of bit transmission is from left to right. In this management frame format, there are 6 fields, i.e. preamble PRE, start of frame ST, operation code OP, PHY address PHYAD, register address REGAD, turnaround TA and data DATA. IDLE is a high-impedance state.

At the beginning of each transaction, the station management issues a sequence of 32 contiguous logic one bits with 32 corresponding cycles to provide the PHY with a pattern that it can use to establish synchronization. The start of frame ST is indicated by a <01> pattern. This pattern assures transitions from the default logic one state to zero and back to one. The operation code OP for a read transaction is <10>, while the operation code for a write transaction is <01>. The PHY address PHYAD is five bits, allowing 32 unique PHY addresses. The register address REGAD is five bits, allowing 32 individual registers to be addressed within each PHY. The turnaround time TA is a 2-bit time spacing between the register field and data field of a management frame to avoid contention during a read transaction. The data field DATA is 16 bits.

After transmitting the preamble information to the PHY, it is expected that a management frame will be accomplished with 32 serial data cycles as depicted in FIG. 6. If the previous management frame is interrupted for some reasons, it is not known by the PHY. This is because the PHY does not have any information regarding the situation. Therefore, the PHY waits until the 32 serial data cycles is completed, and some of preamble of the next management frame is regarded as the data belonging to the previous management frame. Consequently, the preamble of the next management frame seen by the PHY is less than 32 logic 1s. The next management frame is not regarded as a true management frame and is thus discarded. In other words, if the previous management frame is interrupted, the PHY may not recognize the incoming management frame. Therefore, the management frame structure shown in FIG. 6 has a disadvantage in that it may cause the confusion between two continuous MII management frames if the previous management frame is interrupted for some reasons.

Figure 7:
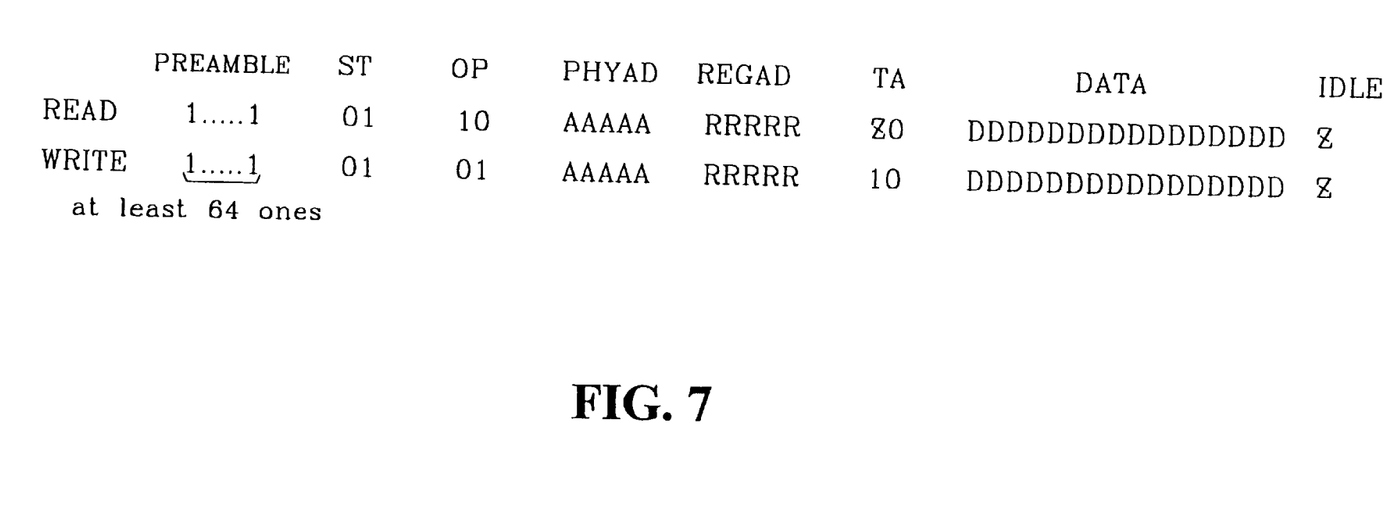
FIG. 7 illustrates the media independent interface management frame structure according to the present invention.

To overcome the drawback, in the present invention, the preamble information is increased up to at least 64 continuous 1s (shown in FIG. 7) so that the PHY can recognize the ending of the previous interrupted management frame. The added 32 or more continuous 1s assure that the PHY normally can recognize the ending of the previous management frame no matter which serial data cycle the previous management frame is interrupted at. Therefore, the PHY can exactly recognize the incoming management frame.

Although this invention has been described with a certain degree of particularity, it is to be understood that the present disclosure has been made by way of preferred embodiments only and that numerous changes in the detailed construction and combination as well as arrangement of parts may be restored to without departing from the spirit and scope of the invention as hereinafter set forth.

What is claimed is:

1. A method for detecting the link status of a network device in a computer system having a control device containing a control unit and a cycle generation unit, comprising the steps of:

issuing a polling enable signal to said control unit;

asserting a polling request signal to said cycle generation unit from said control unit;

issuing a polling cycle by generating a series of clock pulses and serial data to the physical layer of said network device from said cycle generation unit for detecting the link status of said network device;

receiving a status report in said control unit from said physical layer;

analyzing said status report; and determining the link status of said network device, said link status being either link on or link loss.

2. The method according to claim 1, wherein said computer system enters a suspend mode if the link status of said network device is determined as link loss.

3. The method according to claim 1, wherein said computer system resumes a normal mode if said computer system is in a suspend mode and the link status of said network device is determined as link on.

4. The method according to claim 1, wherein said control unit refers to a plurality of parameters including a time unit, a polling frequency and a link loss timeout value before the step of asserting a polling request signal to said cycle generation unit.

5. The method according to claim 4, said plurality of parameters being programmable.

6. The method according to claim 5, said step of determining the link status further comprising a timeout decision step.

7. The method according to claim 6, said timeout decision step comprising:

tracking a time value if said status report indicating link down; and re-asserting a polling request signal to said cycle generation unit from said control unit if said time value has not exceeded said link loss timeout value, otherwise confirming the link status as link loss.

8. The method according to claim 1, said step of issuing a polling cycle comprising transmitting a management frame to a media independent interface.

9. The method according to claim 8, said management frame including a preamble field having a pattern for establishing synchronization at the beginning of said frame.

10. The method according to claim 9, said pattern including a sequence of at least 64 contiguous logical one bits for assuring that an exact polling cycle is complete when a polling cycle is issued.

11. A network polling control apparatus for detecting the link status of a network device in a computer system, comprising:

a programmable polling parameter unit storing a plurality of parameters including a time unit, a polling frequency and a timeout value;

a polling cycle generator sending a sequence of clock pluses and serial data to the physical layer of said network device, and returning a status report indicating the link status of said network device; and a polling controller unit having a polling request generator for issuing a polling request to said polling cycle generator and controlling a polling cycle according to the parameters in said polling parameter unit, a stop/resume controller for receiving said status report from said polling cycle generator and determining if a polling request is to be issued again according to said status report and said timeout value, and a polling result determination unit receiving said status report and returning the link status indicated in said status report to said computer system.

12. The network polling control apparatus according to claim 11, wherein said polling controller further comprising:

a time unit counter for determining a time unit value of a polling cycle according to the time unit stored in said polling parameter unit;

a polling frequency counter for determining the polling frequency of a polling cycle according to the polling frequency stored in said polling parameter unit; and a timeout counter for sending a timeout signal to said stop/resume polling controller based on the timeout value stored in said polling parameter unit;

wherein said time unit counter and said polling frequency counter control said polling request generator, and said timeout counter controls said stop/resume polling controller.

13. The network polling control apparatus according to claim 11, said polling cycle generator generating a management frame data to a media independent interface.

14. The network polling control apparatus according to claim 13, said management frame data including a preamble field having a pattern for establishing synchronization.

15. The network polling control apparatus according to claim 14, said preamble field pattern including a sequence of at least 64 contiguous logical one bits for assuring that an exact polling cycle is issued.

* * * * *